(12) United States Patent
Witherspoon

(10) Patent No.: US 8,739,495 B1
(45) Date of Patent: *Jun. 3, 2014

(54) FIRE AND WATER RESISTANT EXPANSION JOINT SYSTEM

(71) Applicant: Emseal Joint Systems, Ltd., Westborough, MA (US)

(72) Inventor: Bill Witherspoon, Guelph, CA (US)

(73) Assignee: Emseal Joint Systems Ltd., Westborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/721,855

(22) Filed: Dec. 20, 2012

Related U.S. Application Data

(63) Continuation of application No. 12/622,574, filed on Nov. 20, 2009, now Pat. No. 8,365,495.

(60) Provisional application No. 61/116,453, filed on Nov. 20, 2008.

(51) Int. Cl.
*E04B 1/68* (2006.01)

(52) U.S. Cl.
USPC ...... 52/741.3; 52/317; 52/396.01; 52/396.03; 404/68

(58) Field of Classification Search
USPC .................. 52/232, 317, 393, 396.01, 396.03, 52/396.04, 396.07, 396.06, 586.1, 586.2, 52/741.3; 404/47, 68
See application file for complete search history.

(56) References Cited

U.S. PATENT DOCUMENTS

| | | | |
|---|---|---|---|
| 3,355,846 A | 12/1967 | Tillson | |
| 3,372,521 A | 3/1968 | Thom | |
| 3,551,009 A | 12/1970 | Cammuso et al. | |
| 3,670,470 A | 6/1972 | Thom | |
| 3,672,707 A | 6/1972 | Russo et al. | |
| 3,677,145 A | 7/1972 | Wattiez | |
| 3,934,905 A | 1/1976 | Lockard | |
| 3,956,557 A | 5/1976 | Hurst | |
| 4,058,947 A | 11/1977 | Earle et al. | |

(Continued)

FOREIGN PATENT DOCUMENTS

| | | |
|---|---|---|
| CA | 2640007 A1 | 3/2009 |
| DE | 19809973 C1 | 7/1999 |

(Continued)

OTHER PUBLICATIONS

EMSEAL Horizontal Colorseal TechData, Jun. 1997, 2 pages.*

(Continued)

*Primary Examiner* — William Gilbert
(74) *Attorney, Agent, or Firm* — MKG, LLC

(57) ABSTRACT

A fire resistant and water resistant expansion joint system comprises a compressed lamination of fire retardant infused open celled foam, one coat of an elastomeric waterproofing or water resistant material on the lamination, and another coat of an intumescent material on an opposing surface of the lamination, thereby providing fire resistance in one direction and water resistance in the opposite direction. The intumescent material may be further coated with a similar elastomeric material, thereby providing fire resistance in one direction and water resistance in both directions. In the alternative, the compressed lamination may comprise first and second opposing layers of intumescent material thereon each having a respective layer of elastomeric material to provide both water resistance and fire resistance in both directions.

37 Claims, 3 Drawing Sheets

(56) References Cited

U.S. PATENT DOCUMENTS

| | | | |
|---|---|---|---|
| 4,362,428 A | | 12/1982 | Kerschner |
| 4,401,716 A | | 8/1983 | Tschudin-Mahrer |
| 4,455,396 A | * | 6/1984 | Al-Tabaqchall et al. ....... 521/54 |
| 4,566,242 A | * | 1/1986 | Dunsworth ................ 52/396.01 |
| 4,637,085 A | | 1/1987 | Hartkorn |
| 4,773,791 A | | 9/1988 | Hartkorn |
| 4,781,003 A | | 11/1988 | Rizza |
| 4,916,878 A | | 4/1990 | Nicholas |
| 4,942,710 A | | 7/1990 | Rumsey |
| 4,957,798 A | | 9/1990 | Bogdany |
| 5,094,057 A | | 3/1992 | Morris |
| 5,115,603 A | | 5/1992 | Blair |
| 5,130,176 A | * | 7/1992 | Baerveldt ...................... 428/192 |
| 5,213,441 A | | 5/1993 | Baerveldt |
| 5,249,404 A | | 10/1993 | Leek et al. |
| 5,327,693 A | | 7/1994 | Schmid |
| 5,335,466 A | | 8/1994 | Langohr |
| 5,338,130 A | | 8/1994 | Baerveldt |
| 5,365,713 A | | 11/1994 | Nicholas et al. |
| 5,450,806 A | | 9/1995 | Jean |
| 5,508,321 A | | 4/1996 | Brebner |
| 5,572,920 A | | 11/1996 | Kennedy et al. |
| 5,628,857 A | | 5/1997 | Baerveldt |
| 5,887,400 A | | 3/1999 | Bratek et al. |
| 5,935,695 A | | 8/1999 | Baerveldt |
| 6,014,848 A | | 1/2000 | Hilburn, Jr. |
| 6,128,874 A | | 10/2000 | Olson et al. |
| 6,460,214 B1 | | 10/2002 | Chang |
| 6,491,468 B1 | | 12/2002 | Hagen |
| 6,499,265 B2 | | 12/2002 | Shreiner |
| 6,532,708 B1 | | 3/2003 | Baerveldt |
| 6,860,074 B2 | | 3/2005 | Stanchfield |
| 6,948,287 B2 | | 9/2005 | Korn |
| 7,114,899 B2 | | 10/2006 | Gass et al. |
| 7,240,905 B1 | | 7/2007 | Stahl, Sr. |
| 7,748,310 B2 | | 7/2010 | Kennedy |
| 7,941,981 B2 | | 5/2011 | Shaw |
| 8,171,590 B2 | | 5/2012 | Kim |
| 8,317,444 B1 | | 11/2012 | Hensley |
| 2002/0193552 A1 | | 12/2002 | Kiuchi et al. |
| 2003/0110723 A1 | | 6/2003 | Baerveldt |
| 2006/0030227 A1 | | 2/2006 | Hairston et al. |
| 2008/0193738 A1 | | 8/2008 | Hensley et al. |
| 2010/0275539 A1 | | 11/2010 | Shaw |
| 2010/0319287 A1 | | 12/2010 | Shaw |
| 2012/0117900 A1 | | 5/2012 | Shaw |

FOREIGN PATENT DOCUMENTS

| | | |
|---|---|---|
| DE | 102005054375 A1 | 5/2007 |
| EP | 1118715 A1 | 7/2001 |
| GB | 2377379 A | 1/2003 |
| WO | 2007024246 A1 | 3/2007 |

OTHER PUBLICATIONS

"Chlorinated Paraffins as Effective Low Cost Flame Retardants for Polyethylene", Stein et al.; publication date unknown.*

Chlorinated Paraffins as Effective Low Cost Flame Retardants for Polyethylene, Stein et al.; Aug. 3, 2013.*

"Polyurethane Foam Field Joint Infill Systems", Sep. 23, 2007 (via Snagit), PIH, pp. 1-4.

EMSEAL Joint Systems LTD. Drawing Part No. SJS-100-CHT-RN dated Nov. 20, 2007.

EMSEAL Joint Systems LTD. Drawing Part No. 010-0-00-00 dated Dec. 6, 2005.

EMSEAL Material Safety Data Sheet dated Apr. 2002, pp. 1-2.

EMSEAL "Benchmarks of Performance for High-Movement Acrylic-Impregnated, Precompressed, Foam Sealants When Considering Substitutions"; http://www.emseal.com/Knowledge/AcrylicVsWax/AcrylicVsWaxBased.htm; printed on Jul. 3, 2012, pp. 1-4.

EMSEAL Colorseal & Seismic Colorseal Install Data, May 1997, pp. 1-2.

EMSEAL Colorseal Tech Data, Jan. 2000, pp. 1-2.

EMSEAL "Is There a Gap in Your Air Barrier Wall Design?: Overlooking joint sealing where it really matters—in the structural backup wall"; http://www.emseal.com/Knowledge/GapInAirBarrierDesign/GapInAirBarrierDesign.htm; printed on Jul. 19, 2012, pp. 1-2.

Manfredi, Liliana; et al. "Thermal degradation and fire resistance of unsaturated polyester, modified acrylic resins and their composites with natural fibres" Polymer Degradation and Stability 91; 2006; pp. 255-261.

EMSEAL "Pre-cured-Caulk-And-Backerblock" Not New, Not Equal to EMSEAL's COLORSEAL; http://www.emseal.com/Knowledge/PreCuredCaulk/COLORSEALvsPreCuredCaulk.htm; printed on Jul. 19, 2012, pp. 1-3.

"UL Standard for Safety for Tests for Fire Resistance of Building Joint Systems, UL 2079" Underwriters Laboratories Inc. (UL); Fourth Edition; dated Oct. 21, 2004.

* cited by examiner

FIRE AND WATER RESISTANT EXPANSION JOINT SYSTEM

CROSS REFERENCE TO RELATED APPLICATION

This application is a Continuation Application of U.S. patent application Ser. No. 12/622,574, filed on Nov. 20, 2009, which claims the benefit of U.S. Provisional Patent Application No. 61/116,453, filed on Nov. 20, 2008, the contents of each of which are incorporated herein by reference in their entireties and the benefits of each are fully claimed herein.

TECHNICAL FIELD

The present invention relates generally to joint systems for use in architectural applications and, more particularly, to an expansion joint system for use in building and construction systems.

BACKGROUND

Building and construction applications in which materials such as concrete, metal, and glass are used typically employ joint systems that accommodate thermal and/or seismic movements of the various materials thereof and/or intentional movement of various elements relative to each other. These joint systems may be positioned to extend through both the interior and exterior surfaces (e.g., walls, floors, and roofs) of a building or other structure. In the case of an exterior joint in an exterior wall, roof, or floor exposed to external environmental conditions, the joint system should also, to some degree, resist the effects of such conditions. As such, most exterior joints are designed to resist the effects of water. In particular, vertically-oriented exterior joints are designed to resist water in the form of rain, snow, ice, or debris that is driven by wind. Horizontally-oriented joints are designed to resist water in the form of rain, standing water, snow, ice, debris such as sand, and in some circumstances all of these at the same time. Additionally, some horizontal systems may be subjected to pedestrian and/or vehicular traffic and are designed to withstand such traffic.

In the case of interior joints, water tightness aspects are less of an issue than they are in exterior joints, and so products are often designed simply to accommodate building movement. However, interior horizontal joints may also be subject to pedestrian traffic and in some cases vehicular traffic as well.

It has been generally recognized that building joint systems are deficient with respect to fire resistance. In some instances, movement as a result of building joint systems has been shown to create chimney effects which can have consequences with regard to fire containment. This often results in the subversion of fire resistive elements that may be incorporated into the construction of a building. This problem is particularly severe in large high-rise buildings, parking garages, and stadiums where fire may spread too rapidly to allow the structures to be evacuated.

Early designs for fire resistive joints included monolithic blocks of mineral wool or other inorganic materials of either monolithic or composite constructions either in combination with or without a field-applied liquid sealant. In general, these designs were adequate for non-moving joints or control joints where movements were very small. Where movements were larger and the materials were significantly compressed during the normal thermal expansion cycles of the building structure, these designs generally did not function as intended. Indeed, many designs simply lacked the resilience or recovery characteristics required to maintain adequate coverage of the entire joint width throughout the normal thermal cycle (expansion and contraction) that buildings experience. Many of these designs were tested in accordance with accepted standards such as ASTM E-119, which provides for fire exposure testing of building components under static conditions and does not take into account the dynamic nature of expansion joint systems. As described above, this dynamic behavior can contribute to the compromise of the fire resistance properties of some building designs.

Underwriters Laboratories developed UL 2079, a further refinement of ASTM E-119, by adding a cycling regimen to the test. Additionally, UL 2079 stipulates that the design be tested at the maximum joint size. This test is more reflective of real world conditions, and as such, architects and engineers have begun requesting expansion joint products that meet it. Many designs which pass ASTM E-119 without the cycling regime do not pass UL 2079. This may be adequate, as stated above, for non-moving building joints; however, most building expansion joint systems are designed to accommodate some movement as a result of thermal effects (e.g., expansion into the joint and contraction away from the joint) or as a result of seismic movement.

Both expansion joints and fire resistive expansion joints typically address either the water tightness aspects of the expansion joint system or the fire resistive nature of the expansion joint system, as described above, but not both.

Water resistant or water tight expansion joints exist in many forms, but in general they are constructed from materials designed to resist water penetration during the mechanical cycling caused by movement of the building due to thermal effects. These designs do not have fire resistant properties in a sufficient fashion to meet even the lowest fire rating standards. Indeed, many waterproofing materials act as fuel for any fire present, which can lead to a chimney effect that rapidly spreads fire throughout a building.

Conversely, many fire rated expansion joints do not have sufficient ability to resist water penetration to make them suitable for exterior applications. Many designs reliant upon mineral wool, ceramic materials and blankets, and intumescents, alone or in combination with each other, have compromised fire resistance if they come into contact with water. Additionally, as noted above, many fire rated designs cannot accommodate the mechanical cycling due to thermal effects without compromising the fire resistance.

This has resulted in the installation of two systems for each expansion joint where both a fire rating and water resistance is required. In many cases, there simply is not sufficient room in the physical space occupied by the expansion joint to accommodate both a fire rated system and a waterproofing system. In instances where the physical accommodation can be made, the resultant installation involves two products, with each product requiring its own crew of trained installers. Care is exercised such that one installation does not compromise the other.

Many systems also require on-site assembly to create a finished expansion joint system. This is arguably another weakness, as an incorrectly installed or constructed system may compromise fire and water resistance properties. In some cases, these fire resistant expansion joint systems are invasively anchored to the substrate (which may be concrete). Over time, the points at which such systems are anchored are subject to cracking and ultimately spalling, which may subvert the effectiveness of the fire resistance by simply allowing the fire to go around the fire resistant elements of the system.

Many expansion joint products do not fully consider the irregular nature of building expansion joints. It is quite common for an expansion joint to have several transition areas along its length. These may be walls, parapets, columns or other obstructions. As such, the expansion joint product, in some fashion or other, follows the joint. In many products, this is a point of weakness, as the homogeneous nature of the product is interrupted. Methods of handling these transitions include stitching, gluing, and welding. All of these are weak spots from both a water proofing aspect and a fire resistance aspect.

SUMMARY OF THE INVENTION

As used herein, the term "waterproof" means that the flow of water is prevented, the term "water resistant" means that the flow of water is inhibited, and the term "fire resistant" means that the spread of fire is inhibited.

In one aspect, the present invention resides in a fire resistant and water resistant expansion joint system comprising a compressed lamination of fire retardant infused open celled foam, one coat of an elastomeric waterproofing or water resistant material on the lamination, and another coat of an intumescent material on an opposing surface of the lamination, thereby providing fire resistance in one direction and water resistance in the opposite direction. The intumescent material may be further coated with a similar elastomeric material, thereby providing fire resistance in one direction and water resistance in both directions. In the alternative, the compressed lamination may comprise first and second opposing layers of intumescent material thereon each having a respective layer of elastomeric material to provide both water resistance and fire resistance in both directions. The systems as described herein are not limited to any particular type of foam, however, as various types of foams (including polyurethanes) are within the scope of the present invention.

In another aspect, the present invention resides in an architectural joint system comprising first and second substrates arranged to be coplanar and an expansion joint located in compression therebetween. The expansion joint is an open celled polyurethane foam having a fire retardant material infused therein. At least one layer of an intumescent material is disposed on at least one surface of the open celled polyurethane foam, and at least one layer of elastomer is disposed on at least one of a surface of the open celled polyurethane foam and at least one layer of the intumescent material. Upon compression of the expansion joint and its location between the substrates, the expansion joint accommodates movement between the substrates while imparting fire resistance and water resistance.

In another aspect, the present invention resides in a method of installing an expansion joint. In the method of installing such a joint, first and second substrates are provided in a coplanar arrangement such that a gap is formed between the edges thereof. An expansion joint system comprising a foam infused with a fire retardant material and having a water resistant layer and a fire resistant layer disposed thereon is compressed and inserted into the gap between the substrates and allowed to expand to fill the gap.

In the embodiments of the systems described herein, the elastomer material provides for waterproofing or water resistance, the intumescent material provides for fire resistance, and the fire retardant infused open celled foam provides for both fire resistance and movement properties. These materials can be assembled and arranged so as to offer waterproofing or water resistance in one direction and fire resistance in the other (an asymmetrical configuration), or in a fashion that offers both waterproofing (or water resistance) and fire resistance in both directions (a symmetrical configuration) through the building joint. The system is delivered to the job site in a pre-compressed state ready for installation into the building joint.

The expansion joint systems and architectural joint systems of the present invention provide a substantially resilient fire resistant and water resistant mechanism that is able to accommodate thermal, seismic, and other building movements while maintaining both fire and water resistance characteristics.

DETAILED DESCRIPTION OF THE INVENTION

The expansion joint system described is best understood by referring to the attached drawings. The expansion joint system as described herein is shown as being installed between concrete substrates. The present invention is not limited in this regard, however, as the expansion joint system may be installed between substrates or surfaces other than concrete. Materials for such substrates or surfaces include, but are not limited to, glass, asphalt, stone (granite, marble, etc.), metal, and the like.

Figure 1:
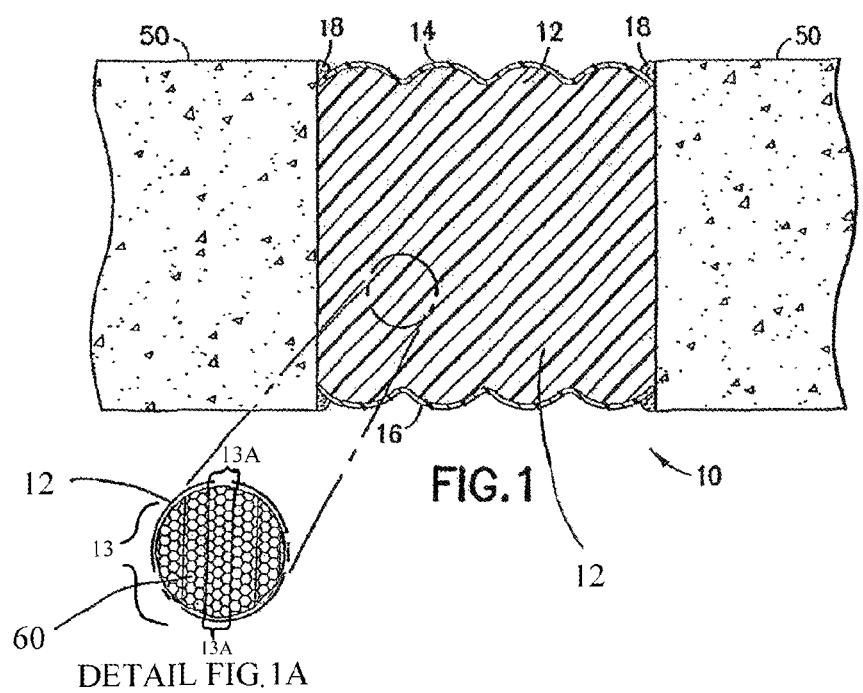
FIG. 1 is a schematic view of one embodiment of an expansion joint system of the present invention.

Referring to FIG. 1, one embodiment of an expansion joint system is shown at 10 and is hereinafter referred to as "system 10." In system 10, compressed laminations 13 of open celled polyurethane foam 12 (hereinafter referred to as "foam 12") are infused with a fire retardant material 60 (as illustrated in Detail FIG. 1A) to form the defined expansion joint locatable between coplanar concrete substrates 50. As stated above, the present invention is not limited to the use of polyurethane foams, as other foams are within the scope of the present invention. The individual laminations 13A extend substantially perpendicular to the direction in which the joint extends and are constructed by infusing each lamination with an amount of fire retardant material 60. However, the structures of the present invention are also not limited in this regard, as the foam may comprise a solid block of non-laminated foam of fixed size depending upon the desired joint size, a laminate comprising laminations oriented parallel to the direction in which the joint extends, or combinations of the foregoing. The amount of fire retardant material 60 infused into the open celled foam is between 3.5:1 and 4:1 by weight in ratio with the un-infused foam itself. The resultant uncompressed foam, whether comprising a solid block or laminates, has a density of about 130 kg/m$^3$ to about 150 kg/m$^3$ and preferably about 140 kg/m$^3$.

One type of fire retardant material 60 that may be used is water-based aluminum tri-hydrate (also known as aluminum tri-hydroxide (ATH)). The present invention is not limited in this regard, however, as other fire retardant materials may be used. Such materials include, but are not limited to, metal oxides and other metal hydroxides, aluminum oxides, antimony oxides and hydroxides, iron compounds such as ferrocene, molybdenum trioxide, nitrogen-based compounds, combinations of the foregoing materials, and other compounds capable of suppressing combustion and smoke formation.

Several laminations of the polyurethane foam, the number depending on the desired size of the expansion joint, are compiled and then compressed and held at such compression in a suitable fixture. The fixture is at a width slightly greater than that which the expansion joint is anticipated to experience at the largest possible movement of the adjacent concrete surfaces. At this width, the infused foam laminate is coated with a waterproof elastomer 14 at one surface. This waterproof elastomer may be a polysulfide, silicone, acrylic, polyurethane, poly-epoxide, silyl-terminated polyether, a formulation of one or more of the foregoing materials with or without other elastomeric components or similar suitable elastomeric coating or liquid sealant materials, or a mixture, blend, or other formulation of one or more of the foregoing. One preferred elastomer coating for application to a horizontal deck where vehicular traffic is expected is Pecora 301, which is a silicone pavement sealant available from Pecora Corporation of Harleysville, Pa. Another preferred elastomeric coating is Dow Corning 888, which is a silicone joint sealant available from Dow Corning Corporation of Midland, Mich. Both of the foregoing elastomers are traffic grade rated sealants. For vertically-oriented expansion joints, exemplary preferred elastomer coatings include Pecora 890, Dow Corning 790, and Dow Corning 795.

Depending on the nature of the adhesive characteristics of the elastomer 14, a primer may be applied to the outer surfaces of the laminations of foam 12 prior to the coating with the elastomer. Applying such a primer may facilitate the adhesion of the elastomer 14 to the foam 12.

The elastomer 14 is tooled or otherwise configured to create a "bellows," "bullet," or other suitable profile such that the elastomeric material can be compressed in a uniform and aesthetic fashion while being maintained in a virtually tensionless environment.

The surface of the infused foam laminate opposite the surface coated with the waterproofing elastomer 14 is coated with an intumescent material 16. One type of intumescent material 16 may be a caulk having fire barrier properties. A caulk is generally a silicone, polyurethane, polysulfide, sylil-terminated-polyether, or polyurethane and acrylic sealing agent in latex or elastomeric base. Fire barrier properties are generally imparted to a caulk via the incorporation of one or more fire retardant agents. One preferred intumescent material 16 is 3M CP25WB+, which is a fire barrier caulk available from 3M of St. Paul, Minn. Like the elastomer 14, the intumescent material 16 is tooled or otherwise configured to create a "bellows" profile to facilitate the compression of the foam lamination.

After tooling or otherwise configuring to have the bellows-type of profile, both the coating of the elastomer 14 and the intumescent material 16 are cured in place on the foam 12 while the infused foam lamination is held at the prescribed compressed width. After the elastomer 14 and the intumescent material 16 have been cured, the entire foam composite is removed from the fixture, optionally compressed to less than the nominal size of the material and packaged for shipment to the job site. This first embodiment is suited to horizontal parking deck applications where waterproofing is desired on the top side and fire resistance is desired from beneath, as in the event of a vehicle fire on the parking deck below.

In this system 10, a sealant band and/or corner bead 18 of the elastomer 14 can be applied on the side(s) of the interface between the foam laminate and the concrete substrate 50 to create a water tight seal.

Figure 2:
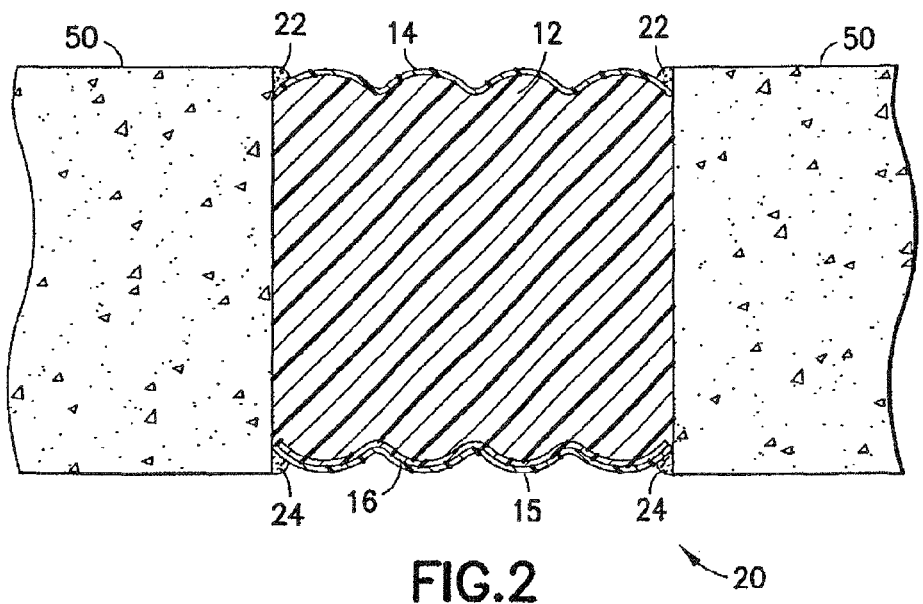
FIG. 2 is a schematic view of another embodiment of an expansion joint system of the present invention.

Referring now to FIG. 2, an alternate expansion joint system 20 of the present invention illustrates the foam 12 having a first elastomer 14 coated on one surface and the intumescent material 16 coated on an opposing surface. A second elastomer 15 is coated on the intumescent material 16 and serves the function of waterproofing. In this manner, the system 20 is water resistant in both directions and fire resistant in one direction. The system 20 is used in applications that are similar to the applications in which the system 10 is used, but may be used where water is present on the underside of the expansion joint. Additionally, it would be suitable for vertical expansion joints where waterproofing or water resistance is desirable in both directions while fire resistance is desired in only one direction. The second elastomer 15 may also serve to aesthetically integrate the system 20 with surrounding substrate material.

Sealant bands and/or corner beads 22 of the first elastomer 14 can be applied to the sides as with the embodiment described above. Sealant bands and/or corner beads 24 can be applied on top of the second elastomer 15, thereby creating a water tight seal between the concrete substrate 50 and the intumescent material.

Figure 3:
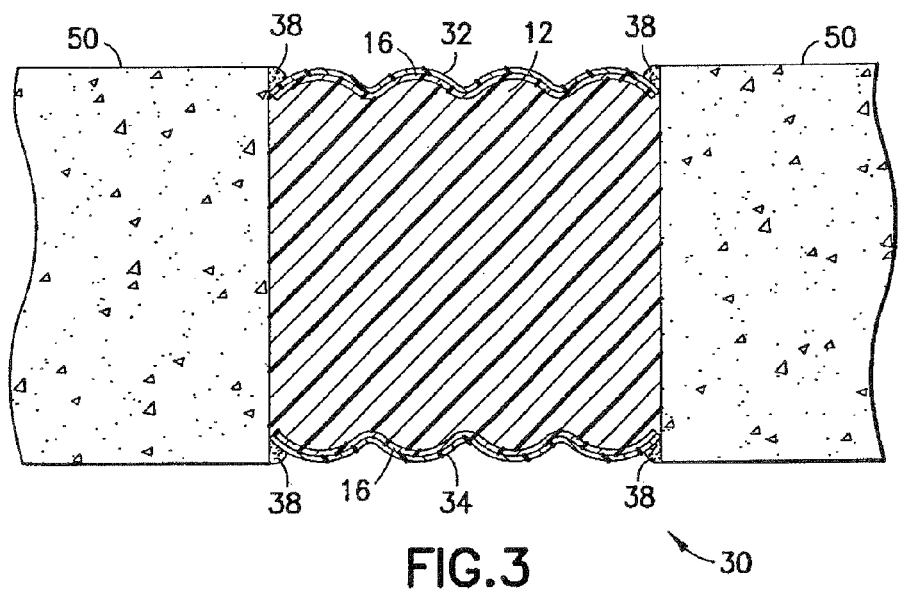
FIG. 3 is a schematic view of another embodiment of an expansion joint system of the present invention.

Referring now to FIG. 3, another expansion joint system of the present invention is shown at 30. In system 30, the foam 12 is similar to or the same as the above-described foam, but both exposed surfaces are coated first with the intumescent material 16 to define a first coating of the intumescent material and a second coating of the intumescent material 16. The first coating of the intumescent material 16 is coated with a first elastomer material 32, and the second coating of the intumescent material 16 is coated with a second elastomer material 34. This system 30 can be used in the same environments as the above-described systems with the added benefit that it is both waterproof or at least water resistant and fire resistant in both directions through the joint. This makes it especially suitable for vertical joints in either interior or exterior applications.

In system 30, sealant bands and/or corner beads 38 of the elastomer are applied in a similar fashion as described above and on both sides of the foam 12. This creates a water tight elastomer layer on both sides of the foam 12.

In each of the embodiments described herein, the infused foam laminate is constructed in a manner which insures that substantially the same density of fire retardant 60 is present in the product regardless of the final size of the product. The starting density of the infused foam is approximately 140 kg/m$^3$. After compression, the infused foam density is in the range of 200-700 kg/m$^3$. After installation the laminate will cycle between densities of approximately 750 kg/m$^3$ at the smallest size of the expansion joint to approximately 400-450 kg/m$^3$ (or less) at the maximum size of the joint. This density of 400-450 kg/m$^3$ was determined through experimentation, as a reasonable minimum which still affords adequate fire retardant capacity, such that the resultant composite can pass the UL 2079 test program. The present invention is not limited to cycling in the foregoing ranges, however, and the foam may attain densities outside of the herein-described ranges.

In horizontal expansion joint systems, installation is accomplished by adhering the foam laminate to the concrete substrate using an adhesive such as epoxy. The epoxy or other adhesive is applied to the faces of the expansion joint prior to removing the foam laminate from the packaging thereof (such packaging may comprise restraining elements, straps, ties, bands, shrink wrap plastic, or the like). Once the packaging has been removed, the foam laminate will begin to expand, and it should be inserted into the joint in the desired orientation further to the application of epoxy or other adhesive materials to the side(s) of the foam laminate if so desired. Once the foam lamination has expanded to suit the expansion joint, it will become locked in by the combination of the foam back pressure and the adhesive.

In vertical expansion joint systems, an adhesive band may be pre-applied to the foam lamination. In this case, for installation, the foam laminate is removed from the packaging and simply inserted into the space between the concrete surfaces to be joined where it is allowed to expand to meet the concrete substrate. Once this is done, the adhesive band in combination with the back pressure of the foam will hold the foam in position.

To fill an entire expansion joint, the installation as described above is repeated as needed. To join the end of one foam laminate to the end of another in either the horizontal configuration or the vertical configuration, a technique similar to that used with the sealant band and/or corner beads can be employed. After inserting one section of a system (joint) and adhering it securely to the concrete substrate, the next section is readied by placing it in proximity to the first section. A band or bead of the intumescent material and the elastomer material is applied on the end of the foam laminate in the appropriate locations. The next section is removed from the packaging and allowed to expand in close proximity to the previously installed section. When the expansion has taken place and the section is beginning to adhere to the substrates (joint faces), the section is firmly seated against the previously installed section. The outside faces are then tooled to create an aesthetically pleasing seamless interface.

The above mentioned installation procedure is simple, rapid, and has no invasive elements which impinge upon or penetrate the concrete (or other) substrates. This avoids many of the long term problems associated with invasive anchoring of screws into expansion joint faces.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A fire and water resistant expansion joint system, comprising:
   foam;
   a fire retardant material infused into the foam; and
   a water resistant layer; wherein the fire and water resistant expansion joint system is configured to define a profile to facilitate compression of the system when installed between substrates, and the fire and water resistant expansion joint system is capable of withstanding exposure to a temperature of about 540° C. or greater for about five minutes.

2. The fire and water resistant expansion joint system of claim 1, wherein the water resistant layer is disposed on a surface of the foam.

3. The fire and water resistant expansion joint system of claim 1, wherein the profile is a bellows profile.

4. The fire and water resistant expansion joint system of claim 1, wherein the water resistant layer comprises silicone.

5. The fire and water resistant expansion joint system of claim 1, further comprising a fire resistance layer.

6. The fire and water resistant expansion joint system of claim 5, wherein the fire resistance layer is disposed on a surface of the foam and the water resistance layer is disposed on a surface of the foam opposing the fire resistance layer.

7. The fire and water resistance expansion joint system of claim 6, wherein the fire resistance layer and the water resistance layer are configured to define a bellows profile.

8. The fire and water resistant expansion joint system of claim 1 further comprising at least one of a sealant band and a corner bead.

9. The fire and water resistant expansion joint system of claim 1, wherein the ratio of the fire retardant material infused into the foam is in a range of about 3.5:1 to about 4:1 by weight.

10. The fire and water resistant expansion joint system of claim 1, wherein the foam has a density when compressed in a range of about 200 kg/m$^3$ to about 700 kg/m$^3$.

11. The fire and water resistant expansion joint system of claim 1, wherein the foam uncompressed has a density of about 130 kg/m$^3$ to about 150 kg/m$^3$.

12. The fire and water resistant expansion joint system of claim 1, wherein the foam comprises open celled polyurethane foam.

13. The fire and water resistant expansion joint system of claim 12, wherein the open celled foam comprises a plurality of laminations of the open celled polyurethane foam.

14. The fire and water resistant expansion joint system of claim 1, wherein the foam has an infused foam density when compressed in a range of about 400 kg/m$^3$ to about 450 kg/m$^3$.

15. The fire and water resistant expansion joint system of claim 1, wherein the fire retardant material infused into the foam is water-based aluminum tri-hydrate.

16. The fire and water expansion joint system of claim 1, wherein the foam comprises a plurality of laminations, at least one of the laminations is infused with the fire retardant material.

17. The fire and water expansion joint system of claim 16, wherein the infused lamination is an inner lamination of the plurality of laminations.

18. The fire and water expansion joint system of claim 16, wherein the laminations are oriented, with respect to the direction in which the joint extends, in at least one of a parallel orientation, a perpendicular orientation, and a combination thereof.

19. The fire and water resistant expansion joint system of claim 1, wherein the fire retardant material infused into the foam has a density which is substantially the same throughout the foam.

20. The fire and water resistant expansion joint system of claim 1, wherein the fire retardant material infused into the foam is selected from the group consisting of metal oxides, metal hydroxides, aluminum oxides, antimony oxides and hydroxides, iron compounds, ferrocene, molybdenum trioxide, nitrogen-based compounds, water-based aluminum tri-hydrate and combinations of the foregoing materials.

21. The fire and water resistant expansion joint system of claim 1, wherein the fire and water resistant expansion joint system is capable of withstanding exposure to a temperature of about 930° C. for about one hour.

22. The fire and water resistant expansion joint system of claim 1, wherein the fire and water resistant expansion joint system is capable of withstanding exposure to a temperature of about 1010° C. for about two hours.

23. The fire and water resistant expansion joint system of claim 1, wherein the fire and water resistant expansion joint system is capable of withstanding exposure to a temperature of about 1260° C. for about eight hours.

24. The fire and water resistant expansion joint system of claim 23, wherein the ratio of the fire retardant material infused into the foam is in a range of about 3.5:1 to about 4:1 by weight.

25. A fire and water resistant architectural expansion joint system, comprising:
a first substrate;
a second substrate arranged at least substantially coplanar to the first substrate; and
an expansion joint located in compression between the first substrate and the second substrate, the expansion joint comprising,
foam;
a fire retardant material infused into the foam; and
a water resistant layer; wherein the fire and water resistant expansion joint system is configured to define a profile to facilitate compression of the system when installed between substrates, and the fire and water resistant expansion joint system is capable of withstanding exposure to a temperature of about 540° C. or greater for about five minutes.

26. The fire and water resistant architectural expansion joint system of claim 25, wherein the ratio of the fire retardant material infused into the foam is in a range of about 3.5:1 to about 4:1 by weight.

27. The fire and water resistant architectural expansion joint system of claim 25, wherein the foam has a density when compressed in a range of about 200 kg/m³ to about 700 kg/m³.

28. The fire and water resistant architectural expansion joint system of claim 25, wherein the water resistant layer is disposed on a surface of the foam.

29. The fire and water resistant architectural expansion joint system of claim 25, wherein the profile is a bellows profile.

30. The fire and water resistant architectural expansion joint system of claim 25, wherein the water resistant layer comprises silicone.

31. The fire and water resistant architectural expansion joint system of claim 25, further comprising a fire resistance layer.

32. The fire and water resistant architectural expansion joint system of claim 31, wherein the fire resistance layer is disposed on a surface of the foam and the water resistance layer is disposed on a surface of the foam opposing the fire resistance layer.

33. A method of installing an expansion joint, comprising:
locating a first substrate;
locating a second substrate arranged to be at least substantially coplanar with the first substrate and being spaced therefrom by a gap;
providing a compressed expansion joint system comprising a foam infused with a fire retardant material and having a water resistant layer thereon;
inserting the compressed expansion joint system into the gap between the first substrate and the second substrate; and
allowing the compressed expansion joint system to decompress to fill the gap between the first substrate and the second substrate, wherein the expansion joint system is capable of withstanding exposure to a temperature of about 540° C. or greater for about five minutes.

34. The method of claim 33, further comprising applying an adhesive to an edge of at least one of the first substrate and the second substrate to anchor the expansion joint system.

35. The method of claim 33, wherein the ratio of the fire retardant material infused into the foam is in a range of about 3.5:1 to about 4:1 by weight.

36. The method of claim 33, wherein the foam has a density when compressed in a range of about 200 kg/m³ to about 700 kg/m³.

37. The method of claim 33, wherein the compressed expansion joint system comprising the foam infused with the fire retardant material and having the water resistant layer thereon, further comprises a fire resistance layer.

\* \* \* \* \*